United States Patent
Bauchot et al.

(10) Patent No.: US 8,289,129 B2
(45) Date of Patent: Oct. 16, 2012

(54) LOCATING RFID TAGS

(75) Inventors: Frederic Bauchot, Saint-Jeannet (FR);
Jean-Yves Clement, Saint-Jeannet (FR);
Gerard Marmigere, Drap (FR);
Joaquin Picon, Cezanne (FR)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/335,601

(22) Filed: Dec. 16, 2008

(65) Prior Publication Data

US 2009/0160603 A1 Jun. 25, 2009

(30) Foreign Application Priority Data

Dec. 20, 2007 (EP) ..................... 07301722

(51) Int. Cl.
*G05B 23/02* (2006.01)
(52) U.S. Cl. .............. 340/3.51; 340/539.13; 342/47; 342/118
(58) Field of Classification Search ............ 340/3.51, 340/539.13; 342/47, 118
See application file for complete search history.

(56) References Cited

U.S. PATENT DOCUMENTS

| | | | |
|---|---|---|---|
| 4,237,536 A | 12/1980 | Enelow et al. | |
| 4,441,288 A | 4/1984 | Feldman et al. | |
| 4,614,945 A | 9/1986 | Brunius et al. | |
| 4,625,473 A | 12/1986 | Peterson et al. | |
| 5,111,184 A | 5/1992 | Heaton et al. | |
| 5,512,879 A | 4/1996 | Stokes | |
| 5,521,601 A | 5/1996 | Kandlur et al. | |
| 5,528,222 A | 6/1996 | Moskowitz et al. | |
| 5,541,577 A | 7/1996 | Cooper et al. | |
| 5,646,592 A | 7/1997 | Tuttle | |
| 5,774,876 A * | 6/1998 | Woolley et al. ............ 705/28 | |

(Continued)

FOREIGN PATENT DOCUMENTS

CA 2417616 7/2002

(Continued)

OTHER PUBLICATIONS

O'Connor, Mary Catherine, Aethon Adds RFID to Robotic Hopsital Helpers, RFID Journal—RFID (Radio Frequency Identification) Technology News & Features; Retrieved from the Internet: < URL: http://www.rfidjournal.com/article/articleview/3330/1/1/ > [Retrieved Feb. 25, 2008]; 3 pages.

(Continued)

*Primary Examiner* — Jennifer Mehmood
*Assistant Examiner* — Naomi Small
(74) *Attorney, Agent, or Firm* — Schmeiser, Olsen & Watts; John Pivnichny

(57) ABSTRACT

A method and RFID tag for locating RFID tags. A passive RFID tag A receives a polling command transmitted from a RFID reader and addressed to another passive RFID tag B. The RFID tag A determines that the polling command is not addressed to the RFID tag A and consequently, at time t1, switches the RFID tag A to a catching mode for catching echos from other tags. The RFID tag A receives at time t3>t1 an echo of a message sent by the RFID tag B to the RFID reader. The RFID tag A determines a distance (D.t2t) between the RFID tag A and the RFID tag B based on t3 minus t1. The distance D.t2t does not exceed a specified radius limit and the identification of the RFID tag B and the distance D.t2t are stored in a database within the RFID tag A.

20 Claims, 5 Drawing Sheets

U.S. PATENT DOCUMENTS

| | | | |
|---|---|---|---|
| 5,804,810 A * | 9/1998 | Woolley et al. | 235/492 |
| 5,825,298 A | 10/1998 | Walter | |
| 5,959,568 A * | 9/1999 | Woolley | 342/42 |
| 6,025,780 A | 2/2000 | Bowers et al. | |
| 6,031,457 A | 2/2000 | Bonkowski et al. | |
| 6,104,337 A * | 8/2000 | Coutts et al. | 342/125 |
| 6,137,413 A | 10/2000 | Ryan | |
| 6,255,959 B1 | 7/2001 | Lake et al. | |
| 6,271,753 B1 | 8/2001 | Shukla | |
| 6,275,157 B1 | 8/2001 | Mays et al. | |
| 6,424,264 B1 | 7/2002 | Giraldin et al. | |
| 6,515,591 B2 | 2/2003 | Lake et al. | |
| 6,662,642 B2 | 12/2003 | Breed et al. | |
| 6,720,866 B1 | 4/2004 | Sorrells et al. | |
| 6,844,816 B1 | 1/2005 | Melton et al. | |
| 6,882,284 B2 | 4/2005 | Lake et al. | |
| 6,960,999 B2 | 11/2005 | Haimovitch et al. | |
| 7,002,461 B2 | 2/2006 | Duncan et al. | |
| 7,042,357 B2 | 5/2006 | Girvin et al. | |
| 7,081,820 B2 | 7/2006 | Minarovic | |
| 7,098,794 B2 | 8/2006 | Lindsay et al. | |
| 7,119,690 B2 | 10/2006 | Lerch et al. | |
| 7,151,455 B2 | 12/2006 | Lindsay et al. | |
| 7,170,412 B2 | 1/2007 | Knox et al. | |
| 7,176,796 B2 | 2/2007 | Chen et al. | |
| 7,382,262 B2 | 6/2008 | Commagnac et al. | |
| 7,382,266 B2 | 6/2008 | Minarovic | |
| 7,383,053 B2 * | 6/2008 | Kent et al. | 455/456.5 |
| 7,791,484 B2 | 9/2010 | Commagnac et al. | |
| 7,812,719 B2 | 10/2010 | Djuric et al. | |
| 7,962,150 B2 * | 6/2011 | Hertzog et al. | 455/456.1 |
| 8,207,820 B2 | 6/2012 | Bauchot et al. | |
| 2001/0008390 A1 | 7/2001 | Berquist et al. | |
| 2002/0073915 A1 | 6/2002 | Howard | |
| 2002/0109607 A1 | 8/2002 | Cumeralto et al. | |
| 2003/0099158 A1 | 5/2003 | De la Huerga | |
| 2003/0234193 A1 | 12/2003 | Clouse | |
| 2003/0234293 A1 | 12/2003 | Sauve et al. | |
| 2004/0066296 A1 | 4/2004 | Atherton | |
| 2004/0108954 A1 | 6/2004 | Richley et al. | |
| 2004/0212480 A1 | 10/2004 | Carrender et al. | |
| 2005/0068169 A1 | 3/2005 | Copley et al. | |
| 2005/0092072 A1 | 5/2005 | Wollenberg et al. | |
| 2005/0093702 A1 | 5/2005 | Twitchell | |
| 2005/0203681 A1 | 9/2005 | Minor | |
| 2006/0066444 A1 | 3/2006 | Steeves | |
| 2006/0092072 A1 | 5/2006 | Steiner | |
| 2006/0111123 A1 | 5/2006 | Nerat | |
| 2006/0162207 A1 | 7/2006 | Morton et al. | |
| 2006/0208887 A1 | 9/2006 | Fields et al. | |
| 2006/0220955 A1 | 10/2006 | Hamilton | |
| 2006/0238341 A1 | 10/2006 | Commagnac et al. | |
| 2007/0001809 A1 | 1/2007 | Kodukula et al. | |
| 2007/0013541 A1 | 1/2007 | Harazin et al. | |
| 2007/0052539 A1 | 3/2007 | Brown | |
| 2007/0080783 A1 | 4/2007 | Ghosh et al. | |
| 2007/0115125 A1 | 5/2007 | Lyon et al. | |
| 2007/0126579 A1 | 6/2007 | Adams et al. | |
| 2007/0126583 A1 | 6/2007 | Maniwa et al. | |
| 2007/0247366 A1 | 10/2007 | Smith et al. | |
| 2007/0285245 A1 | 12/2007 | Djuric et al. | |
| 2007/0288995 A1 | 12/2007 | Terada et al. | |
| 2007/0290924 A1 | 12/2007 | McCoy | |
| 2008/0061939 A1* | 3/2008 | Davis et al. | 340/10.1 |
| 2008/0211676 A1 | 9/2008 | Commagnac et al. | |
| 2008/0261615 A1* | 10/2008 | Kalhan | 455/456.1 |
| 2009/0160622 A1 | 6/2009 | Bauchot et al. | |
| 2009/0201154 A1 | 8/2009 | Bauchot et al. | |
| 2009/0315679 A1 | 12/2009 | Bauchot et al. | |
| 2009/0315685 A1 | 12/2009 | Bauchot et al. | |

FOREIGN PATENT DOCUMENTS

| | | |
|---|---|---|
| JP | 2000018947 | 6/1998 |
| JP | 2003141649 | 5/2003 |
| JP | 2006309592 | 11/2006 |
| KR | 20030067372 | 8/2003 |
| KR | 1020040018301 A | 3/2004 |
| KR | 20050116587 | 12/2005 |
| KR | 20070010340 A | 1/2007 |
| WO | 0077344 | 12/2000 |
| WO | WO0106444 | 1/2001 |
| WO | 02077939 | 11/2001 |
| WO | 2005027079 | 3/2005 |
| WO | 2006105381 | 10/2006 |
| WO | 2007002941 | 1/2007 |
| WO | 2007006085 | 1/2007 |
| WO | 2007041153 | 4/2007 |
| WO | 2007060619 | 5/2007 |
| WO | 2007064747 | 6/2007 |

OTHER PUBLICATIONS

U.S. Appl. No. 12/180,664, filed Date Jul. 28, 2008; Confirmation No. 1523.

Notice of Allowance (Mail Date Aug. 15, 2011) for U.S. Appl. No. 12/180,664, filed Jul. 28, 2008; Confirmation No. 1523.

U.S. Appl. No. 12/234,772, filed Sep. 22, 2008; Confirmation No. 4767.

Office Action (Mail Date Sep. 15, 2011) for U.S. Appl. No. 12/234,772, filed Sep. 22, 2008; Conformation No. 4767.

Challstrom, C.W., NOAA Chairperson, Federal Geodetic Control Subcommittee; Input Formats and Specifications of the Geodetic Survey Data Base, Appendix P (The Description Processing handbook); Mar. 2003; Appendix P Updated Mar. 2007 U.S. Dept. of Commerce, NOAA, NGS, Silver Springs MD: http://www.ngs.noaa.gov/FGCS/BlueBook/Sections: 3.3.1.6.7.

Pham, et al.; Kirker-Othmer Encyclopedia of Chemical Technology, vol. 10: Epoxy Resins John Wiley & Songs, Nov. 19, 2004, p. 348, second paragraph; pp. 457-459, Section 21.4 (Other Electrical and Electronica Applications) and Section 21.5 (Adhesives).

Preliminary Amendment filed Dec. 23, 2008 for U.S. Appl. No. 12/306,272, filed Dec. 23, 2008, Confirmation No. 2136.

Preliminary Amendment filed May 11, 2009 for U.S. Appl. No. 12/306,272, filed Dec. 23, 2008, Confirmation No. 2136.

Office Action (Mail Date Jan. 19, 2011) for U.S. Appl. No. 12/306,272, filed Dec. 23, 2008, Confirmation No. 2136.

Amendment filed Apr. 12, 2011 in Response to Office Action (Mail Date Jan. 19, 2011) for U.S. Appl. No. 12/306,272, filed Dec. 23, 2008, Confirmation No. 2136.

Notice of Allowance (Mail Date May 13, 2011) for U.S. Appl. No. 12/306,272, filed Dec. 23, 2008, Confirmation No. 2136.

Request for Continued Examination filed Jul. 1, 2011 for U.S. Appl. No. 12/306,272, filed Dec. 23, 2008, Confirmation No. 2136.

Office Action (Mail Date Aug. 9, 2011) for U.S. Appl. No. 12/306,272, filed Dec. 23, 2008, Confirmation No. 2136.

Amendment filed Oct. 31, 2011 in Response to Office Action (Mail Date Aug. 9, 2011) for U.S. Appl. No. 12/306,272, filed Dec. 23, 2008, Confirmation No. 2136.

Office Action (Mail Date Dec. 6, 2011) for U.S. Appl. No. 12/306,272, filed Dec. 23, 2008, Confirmation No. 2136.

Office Action (Mail Date Jan. 13, 2010) for U.S. Appl. No. 12/109,319, filed Apr. 24, 2008, Confirmation No. 3211.

Amendment filed Feb. 1, 2010 in Response to Office Action (Mail Date Jan. 13, 2010) for U.S. Appl. No. 12/109,319, filed Apr. 24, 2008, Confirmation No. 3211.

Notice of Allowance (Mail Date May 11, 2010) for U.S. Appl. No. 12/109,319, filed Apr. 24, 2008, Confirmation No. 3211.

Office Action—Ex Parte Quayle (Mail Date Oct. 17, 2007) for U.S. Appl. No. 11/406,911, filed Apr. 19, 2006, Confirmation No. 7351.

Amendment filed Nov. 6, 2007 in Response to Office Action—Ex Parte Quayle (Mail Date Oct. 17, 2007) for U.S. Appl. No. 11/406,911, filed Apr. 19, 2006, Confirmation No. 7351.

Notice of Allowance (Mail Date Feb. 4, 2008) U.S. Appl. No. 11/406,911, filed Apr. 19, 2006, Confirmation No. 7351.

Amendment after Notice of Allowance (Rule 312) filed Feb. 15, 2008 for U.S. Appl. No. 11/406,911, filed Apr. 19, 2006, Confirmation No. 7351.

Supplemental Notice of Allowance (Mail Date Apr. 9, 2008) for U.S. Appl. No. 11/406,911, filed Apr. 19, 2006, Confirmation No. 7351.

Amendment filed Dec. 8, 2011 in Response to Office Action (Mail Date Sep. 15, 2011) for U.S. Appl. No. 12/234,772; filed Sep. 22, 2008; Confirmation No. 4767.

Office Action (Mail Date Nov. 29, 2011) for U.S. Appl. No. 12/336,594, filed Dec. 17, 2008, Confirmation No. 2197.

Request for Continued Examination filed Oct. 19, 2011 for U.S. Appl. No. 12/180,664, filed Jul. 28, 2008, Confirmation No. 1523.

Notice of Allowance (Mail Date Nov. 15, 2011) for U.S. Appl. No. 12/180,664, filed Jul. 28, 2008, Confirmation No. 1523.

Request for Continued Examination filed Jan. 19, 2012 for U.S. Appl. No. 12/180,664, filed Jul. 28, 2008, Confirmation No. 1523.

U.S. Appl. No. 12/336,594, filed Dec. 17, 2008; First Named Inventor Frederic Bauchot; Confirmation No. 2197.

Wang et al.; A Novel Solution to the Reader Collision Problem in RFID System; 2006 IEEE; 4 pages.

Pillai et al.; Using Volatile State Storage for Substantial Improvement in RFID Throughput; 5 pages.

Notice of Allowance (Mail Date Jan. 27, 2012 for U.S. Appl. No. 12/180,664, filed Jul. 28, 2008; Confirmation No. 1623.

Amendment filed Feb. 28, 2012 in response to Office Action (Mail Date Nov. 29, 2011) for U.S. Appl. No. 12/336,594, filed Dec. 17, 2008, Confirmation No. 2197.

Final Office Action (Mail Date Mar. 22, 2012) for U.S. Appl. No. 12/336,594, filed Dec. 17, 2008, Confirmation No. 2197.

Amendment filed Mar. 5, 2012 in response to Office Action (Mail Date Dec. 6, 2011) for U.S. Appl. No. 12/306,272, filed Dec. 23, 2008, Confirmation No. 2136.

Final Office Action (Mail Date Apr. 10, 2012) for U.S. Appl. No. 12/306,272, filed Dec. 23, 2008, Confirmation No. 2136.

U.S. Appl. No. 13/418,739, filed Mar. 13, 2012, Confirmation No. 1496.

Amendment filed May 30, 2012 in response to Final Office Action (Mail Date Apr. 10, 2012) for U.S. Appl. No. 12/306,272, filed Dec. 23, 2008, GAU 2612, Confirmation No. 2136.

Notice of Allowance (Mail Date Jun. 14, 2012) for U.S. Appl. No. 12/306,272, filed Dec. 23, 2008, GAU 2612, Confirmation No. 2136.

Notice of Allowance (Mail Date Mar. 30, 2012) for U.S. Appl. No. 12/234,772, filed Sep. 22, 2008, GAU 2612, Confirmation No. 4767.

Request for Continued Examination and Preliminary Amendment filed Jun. 21, 2012 for U.S. Appl. No. 12/336,594, filed Dec. 17, 2008, GAU 2612, Confirmation No. 2197.

* cited by examiner

LOCATING RFID TAGS

FIELD OF THE INVENTION

The present invention relates to Radio Frequency Identification (RFID) systems and more particularly to RFID devices having capabilities to locate adjacent RFID devices.

BACKGROUND OF THE INVENTION

Radio Frequency Identification (RFID) suits for high technology wireless electronic systems based on message identification. Using tags in such a technology is well known in the art. So far, these wireless systems allow a readable machine or RFID Reader to pick up messages hosted in the tag device. The readable machine transmits a query and tags respond with their identification strings (ID). The query contains a prefix. Generally, the readable machine identifies the tag device on which the identification matches the prefix. However, when more than one tag devices respond to the readable machine an anti-collision protocol is initiated for identifying tags that lead to the collision. In contrast, if no tags match the prefix, there is no response and the readable machine is not capable to identify a tag correctly.

Whereas the existing identification methods fit with a large range of applications, the necessity to use a readable machine for identifying unambiguously a tag among numerous ones in a limited radius is a major inconvenience which among other drawbacks limits the performance of the tag identification.

Moreover, the existing tags do not offer the possibility of picking up signals from adjacent tags located in the delimited vicinity for satisfying the volumetric tag identification ability.

Thus, it would be desirable to offer a new RFID device providing capabilities to offer a solution the aforementioned drawbacks.

SUMMARY OF THE INVENTION

The present invention provides a method for locating Radio Frequency Identification (RFID) tags, said method comprising:

a passive RFID tag A receiving a polling command previously transmitted from a RFID reader and addressed to another passive RFID tag B;

said RFID tag A determining that the polling command is not addressed to the RFID tag A;

in response to the RFID tag A determining that the polling command is not addressed to the RFID tag A, at a time t1 said RFID tag A switching the RFID tag A to a catching mode configured to catch echoes from other tags;

said RFID tag A receiving at a time t3 an echo of a message sent by the RFID tag B to the RFID reader in response to the polling command received by the RFID tag B at a time t2, wherein the echo comprises an identification of the RFID tag B, and wherein t3>t2>t1;

said RFID tag A determining a distance (D.t2t) between the RFID tag A and the RFID tag B based on a total timing (TT) equal to t3 minus t1;

said RFID tag A ascertaining that the distance D.t2t does not exceed a specified radius limit; and responsive to said ascertaining, said RFID tag storing the identification of the RFID tag B and the distance D.t2t in a database within the RFID tag A.

The present invention provides a computer program product comprising a computer usable storage medium having a computer readable program code embodied in the medium, said program code configured to be executed on a processor of a computer system to perform a method for locating Radio Frequency Identification (RFID) tags, said method comprising:

a passive RFID tag A receiving a polling command previously transmitted from a RFID reader and addressed to another passive RFID tag B;

said RFID tag A determining that the polling command is not addressed to the RFID tag A;

in response to the RFID tag A determining that the polling command is not addressed to the RFID tag A, at a time t1 said RFID tag A switching the RFID tag A to a catching mode configured to catch echoes from other tags;

said RFID tag A receiving at a time t3 an echo of a message sent by the RFID tag B to the RFID reader in response to the polling command received by the RFID tag B at a time t2, wherein the echo comprises an identification of the RFID tag B, and wherein t3>t2>t1;

said RFID tag A determining a distance (D.t2t) between the RFID tag A and the RFID tag B based on a total timing (TT) equal to t3 minus t1;

said RFID tag A ascertaining that the distance D.t2t does not exceed a specified radius limit; and responsive to said ascertaining, said RFID tag storing the identification of the RFID tag B and the distance D.t2t in a database within the RFID tag A.

The present invention provides a passive Radio Frequency Identification (RFID) tag, said RFID tag denoted as a RFID tag A, said RFID tag A comprising:

means for receiving a polling command previously transmitted from a RFID reader and addressed to another passive RFID tag denoted as a RFID tag B;

means for determining that the polling command is not addressed to the RFID tag A;

means for switching the RFID tag A at a time t1 to a catching mode configured to catch echoes from other tags in response to the RFID tag determining that the polling command is not addressed to the RFID tag A;

means for receiving at a time t3 an echo of a message sent by the RFID tag B to the RFID reader in response to the polling command received by the RFID tag B at a time t2, wherein the echo comprises an identification of the RFID tag B, and wherein t3>t2>t1;

means for determining a distance (D.t2t) between the RFID tag A and the RFID tag B based on a total timing (TT) equal to t3 minus t1;

means for ascertaining that the distance D.t2t does not exceed a specified radius limit; and means for storing the identification of the RFID tag B and the distance D.t2t in a database within the RFID tag A in response to said ascertaining.

BRIEF DESCRIPTION OF THE DRAWINGS

The above and other items, modules and advantages of the invention will be better understood by reading the following more particular description of the invention in conjunction with the accompanying drawings.

DETAILED DESCRIPTION OF THE INVENTION

Figure 1:
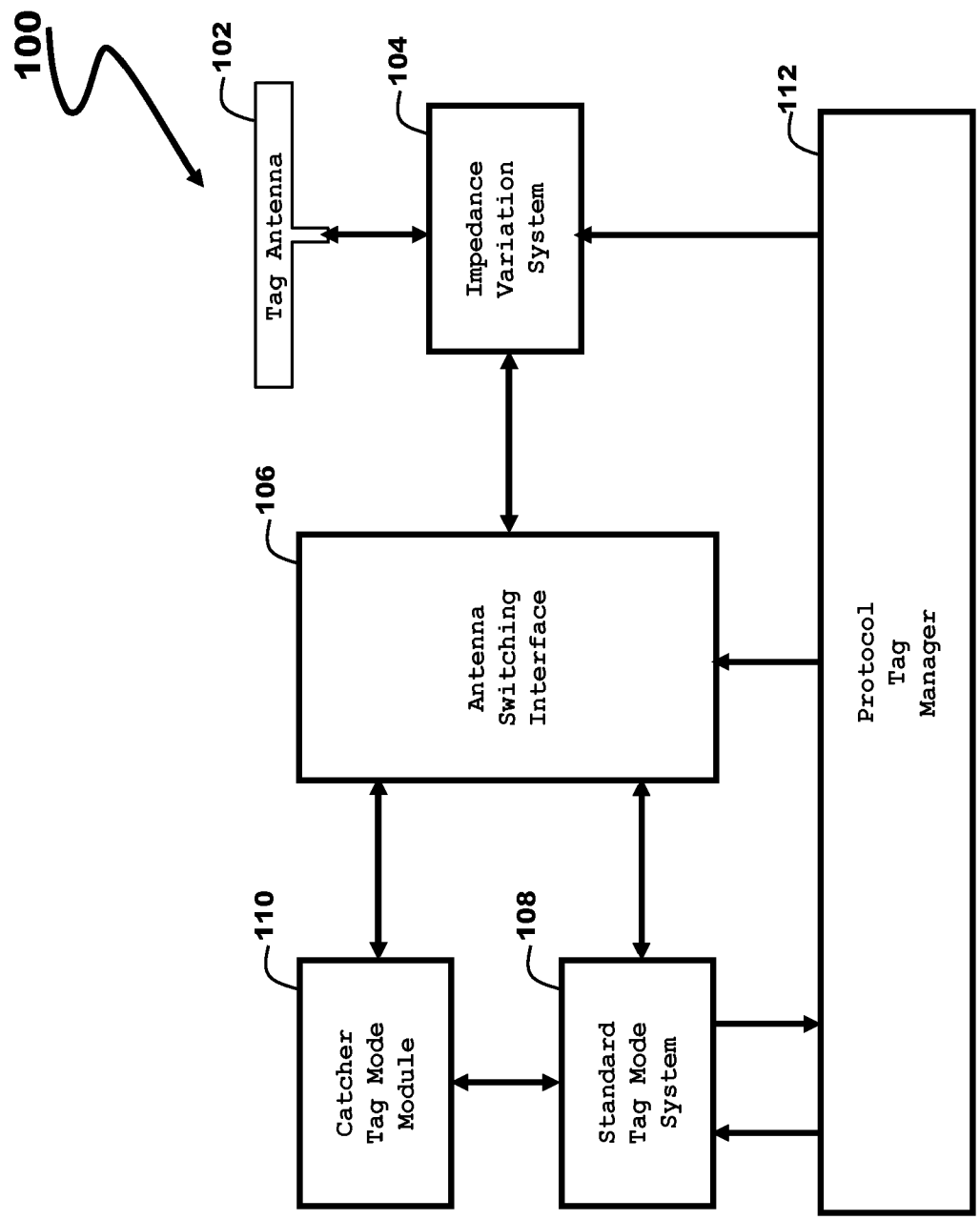
FIG. 1 shows a block diagram representing a general arrangement of a passive tag device, in accordance with embodiments of the present invention.

The present invention provides an enhanced RFID wireless identification device using a passive tag, with peripheral circuits which allow the passive tag to be used either as a standard tag or as a catcher tag which overcome issues of the prior art described supra.

The present invention provides such a RFID device, wherein the identification of adjacent tags is possible.

The present invention to provide a Radio Frequency Identification (RFID) device for reading the content of a message hosted in an adjacent RFID tag and thereby determining the distance between a tag and the adjacent tag.

The present invention gathers identification of a group of adjacent tags in a predefined radius and generates a compacted identification message accordingly.

The present invention filters undesirable identification of, at least, one or more tags located in the delimited vicinity that are outside of a predefined radius.

Tf the present invention localizes uniquely a tag located in various adjacent delimited vicinities.

The present invention determines the quantity of adjacent tags present in the delimited vicinity and generates a list of tags accordingly.

The present invention provides a readable machine, namely a RFID reader, with a selective identification of a group of adjacent tags located in different delimited vicinities as well as in a predefined radius.

The present invention boosts the performance of a readable machine by regrouping the identification of the adjacent tags located in a predefined radius.

The present invention provides a computer program product. The computer program product comprises a computer usable storage medium having a computer readable program code and algorithm embodied in the medium and the computer program product includes at least one component or more to perform the steps of the timing and distance computation and any other calculation described herein, via execution of the program code on a processor of a computer system.

According to the invention, a passive RFID device comprises peripheral circuits allowing it to be used either as a standard passive tag or as a catcher tag. The peripheral circuits comprise means to swap the tag in the desired functionality.

In one embodiment, a RFID device is provided as comprising: receiving means for receiving an identification request from a RFID reader; and sending means responsive to the identification request for sending to the RFID reader an identification message.

The RFID device is characterized in that it further comprises: catching means for receiving a neighbor identification message from at least one adjacent RFID device responding to an identification request from the RFID Reader.

The catching means may comprise an antenna and a circuitry in communication with the antenna having means for processing the received neighbor identification message.

The present invention provides a programmable passive tag that can be used either as a standard tag or as a Catcher tag for picking up signals from adjacent tags located in a delimited vicinity and more specifically in a limited radius.
Physical and Technical Considerations:

A RFID passive tag comprises a microchip attached to an antenna that requires indispensable energy from an external readable machine (i.e., a RFID reader) to operate. The tag antenna is designed to resonate with a specific carrier wave that is provided by the readable machine. Typically, the readable machine sends some bursts of electromagnetic waves to the RFID passive tag that drive the antenna and thereby power correctly the internal circuitry. The RFID device replies to the incoming signals by providing the necessary information about its own identity.

At Ultra-High Frequency (UHF) bands, a passive tag may communicate with a readable machine by the use of a backscattering technique. The backscattering technique operates at UHF (>100 MHz) and higher frequency bands. The backscattering technique comprises modulating with a data signal a portion of the energy transmitted by the readable machine that is reflected by the antenna when resonating.

As shown in FIG. 1, a symbolic view in accordance with embodiments of the present invention represents a general arrangement of a passive tag device (100) comprising a Tag Antenna (102) coupled to an Impedance Variation System (104), an Antenna Switching Interface (106), a Standard Tag Mode Module (108), a Catcher Tag Mode Module (110) and a Protocol Tag Manager (112).

In use, the Tag Antenna (102) communicates with the readable machine (not shown) by backscattering the transmitted carrier wave and providing a receiver (not shown) located within the Antenna Switching Interface (106) with burst of electromagnetic waves of the readable machine for processing. Furthermore, the base of the Tag Antenna (102) is connected to the Impedance Variation System (104). The Impedance Variation System (104) controls dynamically the K-factor of the Tag Antenna (102) via the instructions it receives from the Protocol Tag Manager (112).

The aforementioned K-factor of the Tag Antenna (102) is a function of the impedance load variation at the antenna base that determines a theoretical backscattered power equivalent to P-backscattered that is demonstrated by the formula 1 (Form. 1):

$$P\text{-backscattered} = K\text{-factor} * Pa * G. \quad (\text{Form.1})$$

wherein Pa is the power collected by the tag antenna, G is the gain of the tag antenna, and K-factor is a function of the impedance load variation.

The arrangement of the Antenna Switching Interface (106) with the Standard Tag Mode Module (108) and the Catcher Tag Mode Module (110) insures that the functionality of the passive tag suits a standard mode as well as a catcher mode. To allow the catcher mode, the user configures the required functionality mode at the initialization phase via the Protocol Tag Manager (112).

In standard mode, the Protocol Tag Manager (112) sets the Impedance Variation System (104) in high impedance and activates the Antenna Switching Interface (106) in the appropriate position. Then, the Standard Tag Mode Module (108) receives the flux of electromagnetic waves from the readable machine through the Tag Antenna (102). The Standard Tag Mode Module (108) functionality is similar to any well-known passive tag. Once correctly queried, it provides the readable machine with its own identity as well as other information like the Electronic Product Code (EPC) that is hosted internally according to the standard RFID communication protocol. No further details about the Standard Tag Mode Module (108) functionality will be provided in this section.

The catcher mode differs from the standard mode by the ability to handle data carried by an adjacent tag when answering to a readable machine. To achieve such, a Catcher Tag Mode Module (110) is coupled to the Standard Tag Mode Module (108).

In catcher mode, the Protocol Tag Manager (112) initiates the Impedance Variation System (104) for varying the impedance load at the base of the Tag Antenna (102) and sets the Antenna Switching Interface (106) in the appropriate position that differs from the standard mode.

The Impedance Variation System (104) determines the adequate impedance of the load at base of the Tag Antenna (102) that is necessary for producing an antenna K-factor equal to "0" or "1". The Impedance Variation System (104) drives the Tag Antenna (102) with an internal three state driver circuit (not shown) that automatically adapts the proper impedance termination at the antenna base between whether a high impedance or a low impedance termination is to be set. It is noted that a three state driver produces a low impedance termination when driving a load. When the internal three state driver circuit drives the base of the Tag Antenna (102) by presenting a high impedance termination then the antenna K-factor is equal to "0". Alternatively, when a low impedance termination is presented, then the antenna K-factor is equal to "1" and the impedance of the Impedance Variation System (104) output is equal to the impedance of the antenna.

Then, both the Catcher Tag Mode Module (110) and the Standard Tag Mode Module (108) receive simultaneously the flux of electromagnetic waves from the readable machine via the Tag Antenna (102) for interpretation. The Standard Tag Mode Module (108) checks the query message it receives, detects the matching address as well as the missing ones, and initiates both the Catcher Tag Mode Module (110) and the Protocol Tag Manager (112) for operating.

The Catcher Tag Mode Module (110) interprets the addresses it receives and thereby identifies the correct operating mode for monitoring the reflected carrier wave accordingly. Depending on the operating mode, the Catcher Tag Mode Module either catches data (catching mode) from the adjacent tags answering to the readable machine or carries data (carrying mode) over when queried by the readable machine. Simultaneously, the Protocol Tag Manager (112) receives the matching address that operates the Impedance Variation System (104). Then the Impedance Variation System (104) modulates the reflected carrier waves with data representing, at least, the passive tag identity or requested data. When a missing address appears, the Protocol Tag Manager (112) disables the Impedance Variation System (104). Thereby, the Impedance Variation System (104) loads the Tag Antenna (102) with high impedance.

The Impedance Variation System (104) determines the adequate impedance of the load at the base of the Tag Antenna (102) that is necessary for switching the incident carrier wave from a fully absorbed wave to a fully reflected one and vice versa. Such a variation generates a modulation that can carry information by the use of the backscattering technique. By mixing a modulation of the reflecting carrier waves with the backscattering technique, a passive tag that responds to a query of a readable machine is capable to transmit its own identity message to at least one or more adjacent tags. Then, the modulation of the reflecting carrier waves is transmitted to the readable machine for interpreting the tag response.

It is noted that the aforementioned passive tags are located in a delimited vicinity and a limited radius which is preset at the tag configuration step via the Protocol Tag Manager (112).

However, the Protocol Tag Manager (112) requires some adjustments for satisfying the present invention. Indeed, some additional parameters are included in the existing RFID messages allowing both the readable machine and the tags to get the necessary parameters for determining tags positioned in a delimited vicinity.

Some of the parameters are listed herein as follows.

The acknowledge signal (ACK) issued from the readable machine when interrogating comprises three fields for loading parameters.

The first field contains a computed random number allowing a tag to be identified unambiguously by the random number when a readable machine initiates a query (RN16).

The second field contains the distance (D) value between the polled tag and the readable machine.

Finally, the third field provides a radius (Rlimit) value of a circle for which the polled tag represents the axis and further defines the area in which a tag can be considered as adjacent to the polled tag.

In addition, the tag response message contains data that provides the readable machine with computed information like PC, EPC, D (the distance between the polled tag and the readable machine) and an EPC_LIST representing the list of the adjacent tags.

Figure 2:
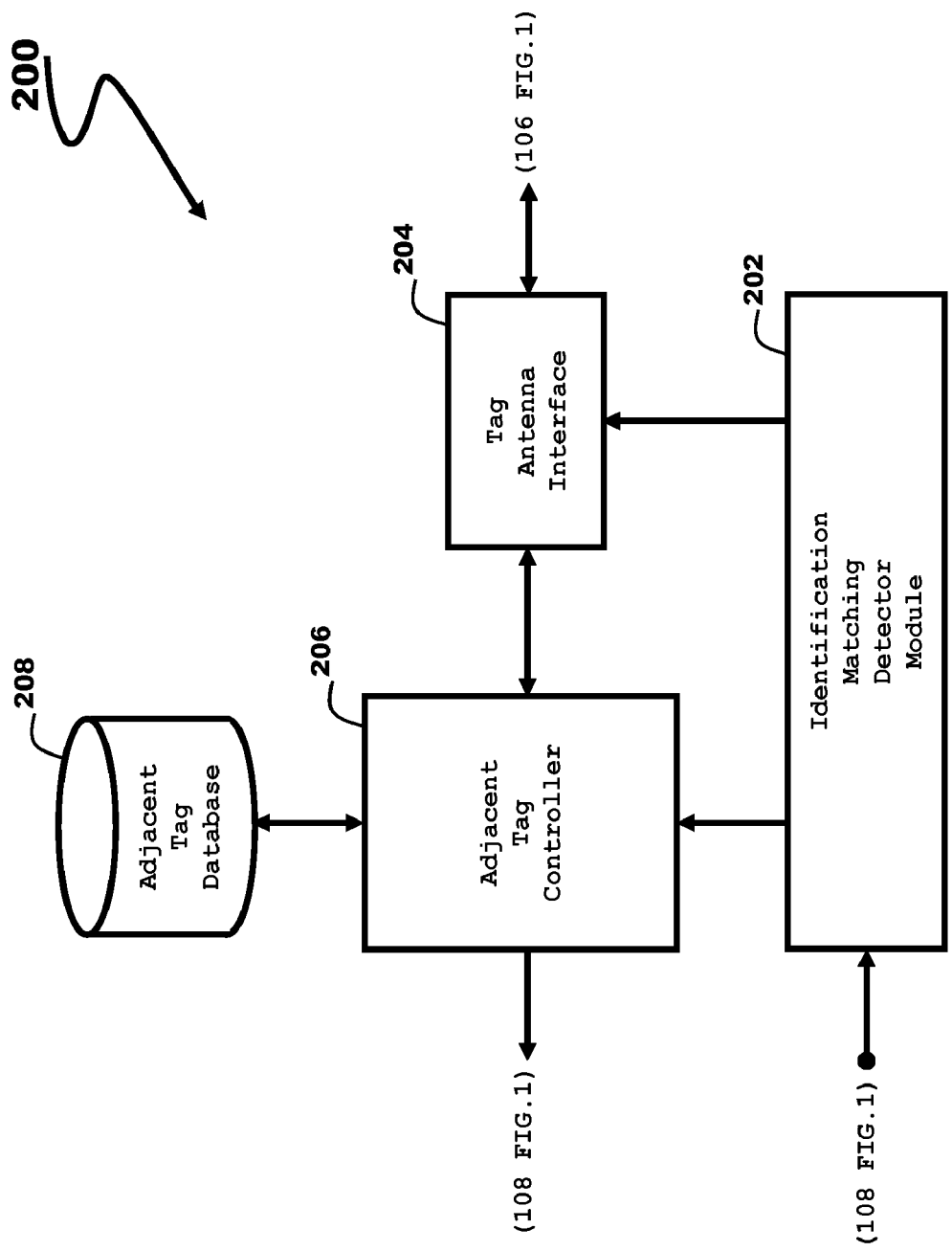
FIG. 2 depicts the Catcher Tag Mode Module, in accordance with embodiments of the present invention.

FIG. 2 illustrates in a high level, the Catcher Tag Mode Module (200) as may be applicable to the general arrangement of the passive tag device (100) of FIG. 1, in accordance with embodiments of the present invention.

When the tag is set in a catcher mode, the Catcher Tag Mode Module (200) operates in two ways.

Firstly, the readable machine queries the passive tag by using a standard protocol. The passive tag identifies the address it receives and, if a matching comparison occurs, turns the Catcher Tag Mode Module (200) in carrying mode. Thereby, the Catcher Tag Mode Module (200) takes advantage of the reflected carrier wave of a readable machine for carrying data, like tag identification and qualifiers and other relevant data that are stored in a local memory, over the antenna by the use of the backscattering technique.

Secondly, if there is no matching occurrence with the query of the readable machine, then the Catcher Tag Mode Module (200) is enabled in the catching mode to catch the data carried from the readable machine as well as those coming from the adjacent tags answering to the readable machine in the delimited vicinity. A local micro controller (not shown) identifies the adjacent tags located around and initiates a distance computation in between by running a microcode algorithm.

The Catcher Tag Mode Module (200) comprises an Identification Matching Detector Module (202), a Tag Antenna Interface (204) and an Adjacent Tag Controller (206) with an associated Adjacent Tag Database (208).

The Identification Matching Detector Module (202) decodes the addresses it receives from the Standard Tag Mode Module, identifies the correct operating mode (i.e., carrying mode or catching mode) and adapts the Catcher Tag Mode Module (200) functionality by setting the Tag Antenna Interface (204) accordingly.

If the decoded address does not match the query of the readable machine then the Identification Matching Detector Module (202) turns both the Adjacent Tag Controller (206) and the Tag Antenna Interface (204) in "catching mode". Then, the Tag Antenna Interface (204) catches the data reflected from the adjacent tags answering to the readable machine and, after demodulating, provides the Adjacent Tag Controller (206) with a stream of data and qualifiers that are carried by the flux of electromagnetic waves.

In the other case, where the addresses of the passive tag match with the query of the readable machine, the Identification Matching Detector Module (202) turns both the Adjacent Tag Controller (206) and the Tag Antenna Interface (204) in "carrying mode". Then, the Tag Antenna Interface (204) carries data with accompanying qualifiers from the Adjacent Tag Controller (206) over the Tag Antenna.

The Tag Antenna Interface (204) contains circuitry for managing the reflected carrier waves and further comprises circuitry for reducing the path between the Antenna Switching Interface (106) and the Adjacent Tag Controller (206) that optimizes the performance of the backscatter technique.

Figure 5:
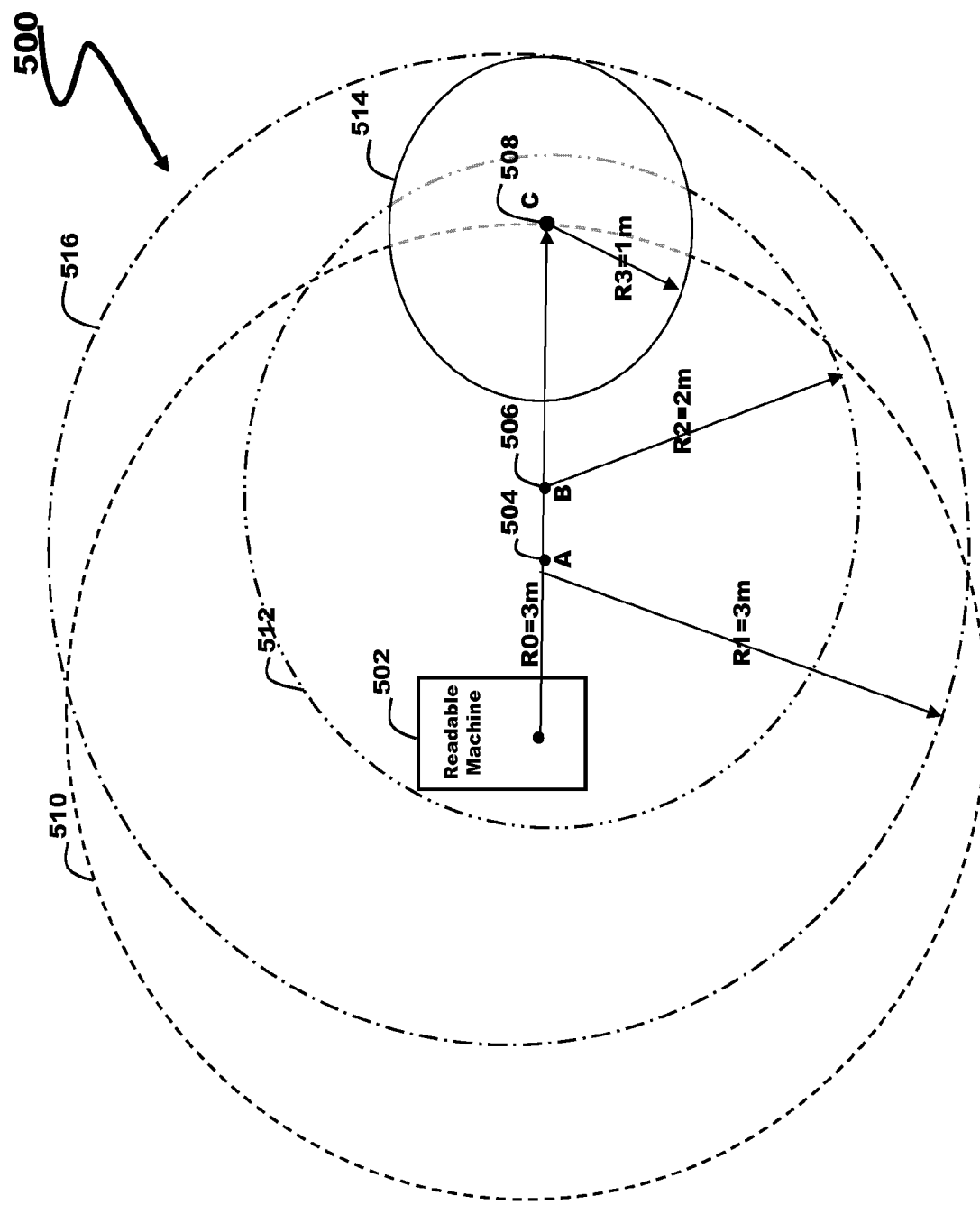
FIG. 5 illustrates an example of a suitable power budget allowing the Catcher Tag Mode Module to catch reflected data from an adjacent tag by satisfying the backscattering technique, in accordance with embodiments of the present invention.

The performance of the backscatter technique depends essentially on the backscattering yield that is a function of the relationship between the gain of a tag antenna and the path length from the receiver to the antenna as well as the definition of the suitable power budget for satisfying the receiver sensitivity as demonstrated in FIG. 5.

The Adjacent Tag Controller (206) is micro controller-based and interacts with a storage device, like a flash memory or equivalent (not shown), located in the Adjacent Tag Database (208).

In catching mode, the Tag Antenna Interface (204) transmits, after executing a demodulation, both the data and the associated qualifiers to the readable machine. Simultaneously, the Adjacent Tag Controller (206) picks them (i.e., the data and the associated qualifiers) for feeding the micro controller. Then the micro controller (not shown) initiates a computation processing by interpreting the content of the information carried by the flux of electromagnetic waves. Such content contains information like the adjacent tag identification or tag-to-tag distance or tag-to-readable machine distance as well as a list identifying a group of adjacent tags located in the same vicinity or any other required information for deriving tag geographical information. Then, the Adjacent Tag Controller (206) extracts the elements that identify the tag, interprets tag distance qualifiers, initiates the distance algorithm, determines the tags matching with the predefined user's criteria, references them and stores all parameters and results into the storage device of the Adjacent Tag Database (208). It is noted that the distance computation is aggregated over the qualifiers that identify the adjacent tags.

In carrying mode, the Adjacent Tag Controller (206) selects from the Adjacent Tag Database (208) the distance information of the adjacent tags previously stored during the catching mode. Furthermore, it provides the readable machine with information related to its identification (EPC). Then the Adjacent Tag Controller (206) transmits the data with accompanying qualifiers from the Tag Antenna Interface (204) over the Tag Antenna (FIG. 1:102).

Figure 3:
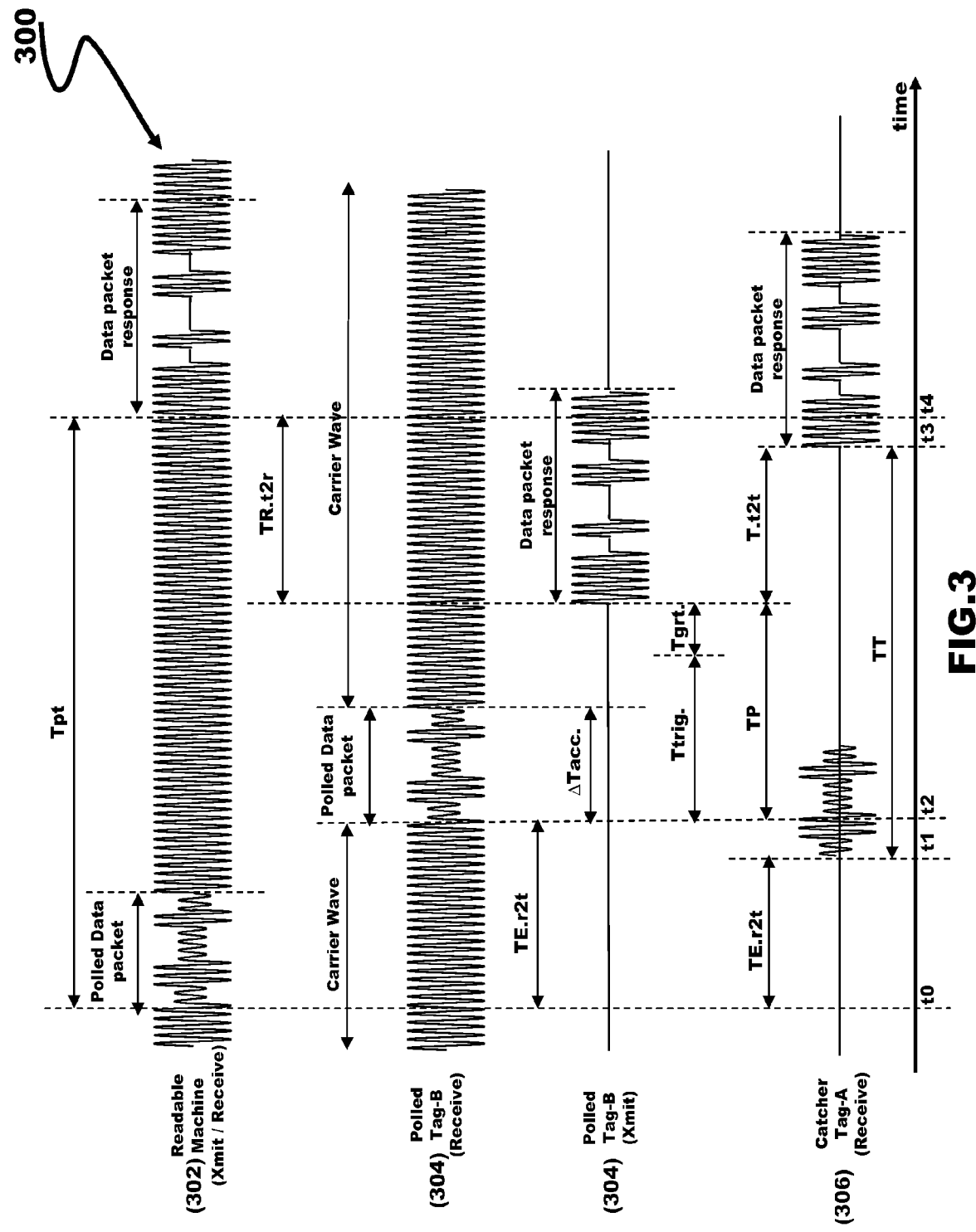
FIG. 3 shows an analysis of the total process timing from an emitted signal by the readable machine until a backscattered catching data packet of a tag answers to the readable machine, in accordance with embodiments of the present invention.

Going now to FIG. 3, wherein an analysis of the total process timing from an emitted signal by the readable machine until a backscattered catching data packet of a tag answers to the readable machine is described in detail, in accordance with embodiments of the present invention.

In operation, a readable machine (302) broadcasts a reader command within a round frame that initiates a sequence of asynchronous exchanging messages between the readable machine and a series of tags (i.e. 304 and 306) located in the frame size. The round frame size depends on the emitted power of the readable machine and is represented by a radius (Rrange) that delimitates the communication range between the readable machine and the tags.

The readable machine produces a query to a remote tag. The remote tag collects the information of the query and, after processing its identification, transmits data packets to the readable machine. The data packets transmitted to the readable machine contain information related to the separating distance from the tag to the readable machine (D.t2r). The total process timing (Tpt) duration that is required to achieve such an operation varies in proportion to the position of the tags in the frame and the length of the data packets that need to be treated.

The total process timing (Tpt) represents the time (at time t4) it takes for a readable machine to receive a data packets from a polled tag after the readable machine starts to poll a tag by initiating a reader command at time t0. Thus, Tpt is equal to t4 minus t0.

Then, for satisfying both the process tracking and distance computing, some parameters are stored into a register in both the reader and the polling tag for future usage. Such parameters comprise the start time, the end time and the duration of the total process timing (Tpt) as well as the allotted radius limit (Rlimit) in which tags are considered as adjacent.

It is to be noted that the aforementioned allotted radius limit (Rlimit) is part of the acknowledge signal (ACK) and can be defined either on user configuration or in real time by the use of the readable machine at an initialization step.

Generally, the operations that generate a variation of the process timing comprise the following events as listed herein:
   the emitting transmission time (TE.r2t) that is a function of the distance (D.t2r) there exists between a remote tag and the readable machine and;
   the granted time of the tag for responding (Tgrt) which is related to the process to do on the data and;
   the access time of the tag ($\Delta$Tacc) that a tag needs for reading a received data packet that is in proportion of the data packet length and;
   the responding transmission time (TR.t2r) for transmitting data from the tag to the readable machine that is normally identical to the emitting transmission time (TE.r2t).

To illustrate the duration of a total process timing (Tpt) consider the formula 2 (Form.2) as demonstrated herein.

$$Tpt = 2\ TX + Tgrt + \Delta Tacc \quad\quad\quad (\text{Form.2})$$

with:

$$TX = TE.r2t = TR.t2r = D.t2r/C.$$

wherein: D.t2r is the distance (m) between the readable machine and the tag, C is the light speed equal to 300000 km/s, TE.r2t and TR.t2r are the transmission times between the readable machine and the tag, Tgrt is the granted time for a tag for processing the received data packet, and $\Delta$Tacc is the access time of the tag for reading the received data packet.

Thus, as demonstrated in Form.2, the total process timing (Tpt) of a polling process depends essentially on both the transmission times (TE.r2t and TR.t2r), the unavoidable access time ($\Delta$Tacc) and the time for tag processing (Tgrt), of the responding tag. It is to be noted that the access time ($\Delta$Tacc) of a responding tag and the time (Tgrt) for tag processing of the responding tag varies due to different data packet lengths and consequently randomizes the timing variation of the total process timing (Tpt) that may be a concern when using the present invention.

Both transmission times (TE.r2t and TR.t2r) are derived by executing a round scanning of the tag population when starting a reader command. Then, each tag radius (R.t2r) as well as other parameters related to the position of the tag are determined in regards to the readable machine and are sent to each polling tag for hosting. In addition, when responding to the readable machine, a polled tag includes in the transmitted data packet said radius sent by the readable machine which allows any non-polled tags to obtain the separating distance (D.t2$r$) for hosting.

In order to bypass the undesirable timing variations of the access time ($\Delta$tacc) and the time for tag processing (Tgrt), each polled tag (i.e. Tag-B: 304), that is consequently set in carrying mode, enables a particular delay circuitry that triggers, at a presetting time value (Ttrig), the responding data packet independently of the data packet length and data process. The presetting time value (Ttrig) is not less than a sum of a maximum value of $\Delta$tacc and a maximum value of Tgrt. The presetting time value (Ttrig) can be loaded either on user configuration or in real time by the use of the readable machine at initialization step.

Additionally, each non-polling tag (i.e. Tag-A: 306) switches to catching mode. Then, each non-polling tag uses the backscattering technique for generating a total timing envelope (TT) that represents the timing length of the ongoing transaction. The total timing envelope (TT) starts, at time t1, when each non-polling tag receives a polling command addressed to a polled tag. The occurrence of the received data packet from the tag answering to the readable machine, at time t3, determines the endpoint of the envelope in time.

Each tag contains its own transmission time parameters (TE.r2$t$ and TR.t2$r$) previously stored at initialization time and furthermore each tag catches the transmission time parameters (TE.r2$t$ and TR.t2$r$) belonging to the tag answering to the readable machine by the use of the backscattering technique. By integrating the total timing envelope (TT) with the aforementioned transmission time parameters, each non-polled tag (i.e. Tag-A: 306) infers the separating transmission time (T.t2$t$) with the polled tag responding and consequently the distance (D.t2$t$) between the non-polled tag and the polled tag.

Finally, the separating transmission time (T.t2$t$) is compared with time limit derived from the allotted radius limit (Rlimit) to determine if the responding polled tag is adjacent to the non-polled tag. If it is the case, the responding tag Id is saved to be further transmitted to the readable machine.

For implementing such algorithm, all RFID tags are synchronized in time. This is achieved by using received signal carrier from the RFID reader as an internal time base.

The formula 3 (Form.3) details the computation steps for determining the separating transmission time (T.t2$t$) of a series of tags located in the same vicinity of a catcher tag (Tag-A) and thereby defining that a tag is adjacent to another one as demonstrated herein:

$$TT=[TE.r2t.\text{tag}B-TE.r2t.\text{tag}A]+TP+T.t2t$$

$$T.t2t=TT-TP-[TE.r2t.\text{tag}B-TE.r2t.\text{tag}A] \quad \text{(Form.3)}$$

It is to be noted that TE.r2$t$.tagA (catcher) has been previously set by the readable machine and TE.r2$t$.tagB is set in the response of Tag-B to the readable machine.

If (T.t2$t$)*C$\leq$Rlimit then tagA and TagB are adjacent. wherein: TE.r2$t$.tagA is the transmission time for Tag-A (306), TE.r2$t$.tagB is the transmission time for Tag-B (304), TT is the total timing envelope, and TP is equal to Ttrig. Ttrig represents a constant delay for getting rid of the variation of the tag access time ($\Delta$Tacc) when reading a received data packet and data granted processing time (Tgrt). Tgrt is the processing time for a tag for responding.

Figure 4:
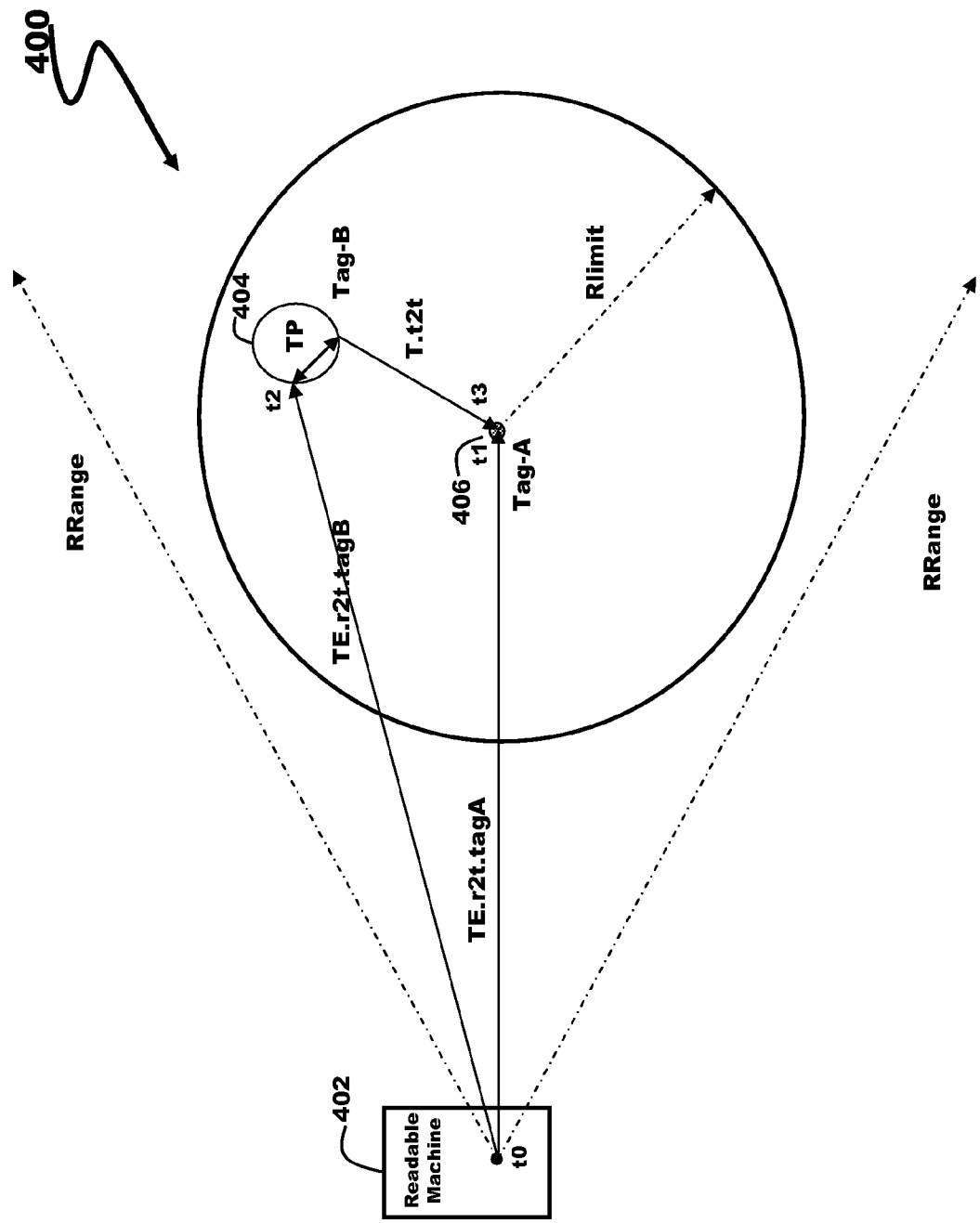
FIG. 4 shows a sequence of a separating distance computation for determining the proximity of tags located in the same vicinity, in accordance with embodiments of the present invention.

Going now to FIG. 4, a sequence of a separating distance computation for determining the proximity of Tag-A (406) to Tag-B (404) (i.e., the distance between Tag-A (406) and Tag-B (404)) will now be described in reference to both the FIG. 3 and the Formula 3, in accordance with embodiments of the present invention.

At time t0, a readable machine (402) broadcasts within a delimited communication range (Rrange) a polled data to be transmitted to Tag-A (406) and Tag-B (404).

Both Tag-A (406) and Tag-B (404) are located at different distances from the readable machine (402) and need respectively TE.r2$t$.tagA and TE.r2$t$.tagB transmission time to be reached.

In the present example, the placement configuration assumes that Tag-A (406) is closer than Tag-B (404) to the readable machine (402) and consequently receives, at time t1, the polled data before Tag-B (404) receives the polled data at time t2.

At time t0, each tag contains information on the allotted radius limit (Rlimit) where tags are considered as adjacent by the readable machine (402).

Then, the readable machine (402) polls Tag-B (404).

Tag-B (404) replies to the readable machine by providing its identification (EPC) and the separating distance parameters (D.t2$r$) between Tag-B (404) and the readable machine (402). It is noted that the separating distance computation is derived from the transmission time (TE.r2$t$.tagB).

Additionally, Tag-A (406) switches in catching mode and is thus capable of receiving and interpreting the echo coming from Tag-B (404) by the use of the backscattering technique.

It is noted here that, by the use of the backscattering technique, Tag-A (406) is capable of catching the flux of electromagnetic waves existing between the readable machine (402) and the polling Tag-B (404).

Then, at time t1, Tag-A (406) initiates the timing time envelope (TT) while, at time t2, Tag-B (404) starts polling data packets and enables the delay circuitry allowing to trigger at a presetting time value (Ttrig) the responding data packet.

At the predefined time value (Ttrig) expiration, Tag-B (404) transmits requested data packets to the readable machine (402).

As already explained before, the aforementioned data packet contains the Tag-B (404) identification (EPC) and the information related to the separating distance (D.t2$r$) between the Tag-B (404) and the readable machine (402).

While Tag-B (404) transmits the requested data packet to the readable machine (402), Tag-A (406) receives transmission time (T.t2$t$) later, at time t3, the echo from Tag-B (404) and consequently ends the processing of timing envelope (TT) that started at time t1.

Then Tag-A (406) computes the separating transmission time (T.t2$t$) by applying the formula of Form.3 and determines if Tag-A (406) is adjacent to Tag-B (404) or not.

Tag-A (406) contains the necessary parameters for computing the separating transmission time: TE.r2$t$.tagA transmission time; TE.r2$t$.tagB transmission time; TP (defined); TT (defined as the difference between t3 and t1); and the allotted radius limit (Rlimit) (defined). Thus the computation of the separating transmission time (T.t2$t$) is defined.

Then, the result of distance pertaining to the computed separating transmission time (T.t2$t$) is compared to the allotted radius limit (Rlimit). Finally, Tag-A (406) is adjacent to Tag-B (404) and vice-versa if the separating transmission time (T.t2$t$) determines a distance (T.t2$t$*C) that is equal or less than the allotted radius limit (Rlimit) by respecting the delimited communication range condition (Rrange) in which both Tag-A and Tag-B are located.

FIG. 5 illustrates in a high level a typical power budget allowing the Catcher Tag Mode Module (FIG. 1:110) to catch reflected data from an adjacent tag by using the backscattering technique.

Some references to formulate the power budget arrangement are initially described as follows.

Gain of an antenna: The theoretical gain of an antenna coupled to a path length less than 1 cm is around 2 dBi (isotropic) that produces a comfortable backscattering yield (c.f. reference from an article published by the "Intelleflex Corporation"). An isotropic antenna broadcasts power equally in all directions. The real gain of the aforementioned isotropic antenna is equal to 0 dB as given by the converting formula: 0 dB=2,14 dBi.

dBm unit (decibel-milliWatt): In a RFID wireless network the symbol dBm refers to relative changes in magnitude. Some examples of Watt to dBm conversion are illustrated below:
1W transmission power=30 dBm
1.3 mW==1 dBm
100 µW==-10 dBm
63 nW==-42 dBm Minimum energy for powering a tag: The minimum energy (P_tagmin) for powering a passive RFID tag is around −10 dBm (100 µW) that is above of the sensitivity of a standard tag receiver. Generally, the sensitivity of a standard tag receiver is −42 dBm (63 nW). By comparison, a semi-passive RFID tag contains an internal battery that provides the electronic circuitry with the necessary energy. Thereby, the power limitation of the semi-passive RFID tag is due only to the receiver sensitivity (−42 dBm).

Loss of modulation: Measurements in anechoic chamber commonly give a tag return loss of 32 dB for a measuring distance of 50 cm (c.f. K. V. Seshagiri Rao IEEE white paper December 2005) as detailed in the formula 4 (Form.4) herein:

$$\text{Loss}(db) = 10 \, \text{Log}((4 * Pi * D)/\text{Lamda})^2. \quad \text{(Form.4)}$$

wherein: D is the distance (m) and Lamda is the wavelength of the frequency in use (i.e. 860 MHz for UHF and 300000 cm/s for the light speed that gives Lamda=300/860).

Formula 4 (Form.4) demonstrates that, an UHF transmission (860 MHz) in the air has:
31.15 dB of modulation lost at 1 meter of distance from a readable machine and;
37.15 dB of modulation lost at 2 meters of distance and;
40.60 dB of modulation lost at 3 meters of distance.

The backscattering loss (bkst_loss) with no modulation is less than 1 db (c.f. Intelleflex Corporation).

The maximum carrier wave attenuation (CWave_att), for providing the receiver with sufficient energy (P_tagmin), depends on both the emitted power (P_reader) and the transmission gain penalty (P_penalty). The transmission gain penalty (P_penalty) is proportional to the separating distance of the Catcher Tag Mode Modules (FIG. 1:110) with the readable machine.

The receiver that is included in the Catcher Tag Mode Modules (FIG. 1:110) needs −10 dBm of minimum power (P_tagmin) to be activated. Then, the maximum carrier wave attenuation (CWave_att) allowing the Catcher Tag Mode Modules (FIG. 1:110) to receive enough energy to operate is given by the formula 5 (Form.5):

$$CWave\_att < P\_tagmin \leq P\_reader - P\_penalty$$

$$P\_penalty \leq P\_reader - CWave\_att \quad \text{(Form.5)}$$

wherein: CWave_att is the maximum carrier wave attenuation allowed, P_tagmin is the minimum energy for activating a tag (−10 dBm), P_reader is the power delivered by the readable machine (30 dBm), and P_penalty is the transmission gain penalty that is a function of the distance between the readable machine and the receiver.

Thus, it is shown that the maximum separating distance is proportional to the transmission gain penalty (P_penalty) that appears between the readable machine and the receiver.

By assuming that the forward power of the RFID readable machine is 1 W (30 dBm), the formula 5 (Form.5) shows that the maximum transmission gain penalty is 40 db (P_penalty=30 dBm−−10 dBm=40 db equivalent to 10*Log(1000 mW/0.1 mW)) that gives a maximum separating distance of 3 meters as demonstrated in formula 4 (Form.4).

Finally, in catching mode, a tag that is supplied within the same readable machine range as an adjacent polling tag can receive a backscattered response from the aforementioned tag by the limit of its receiver sensitivity. Consequently, a power budget for determining the maximum attenuation of the backscattered signal that is allowed for achieving a distant tag receiver sensitivity, in catching mode, when the communication with an adjacent tag, in carrying mode, is in limit of range is demonstrated by FIG. 5 with the accompanying of the formula 6 (Form.6) herein:

$$CWave\_att \leq P\_tagmin \leq P\_reader - P\_penalty$$

$$Max\_att\_all \leq P\_tagmin.tag\_A - Cwave\_att - bkst\_loss.tag\_B \quad \text{(Form.6)}$$

wherein:
tag_A=tag in catching mode;
tag_B=tag in carrying mode;
Max_att_all is maximum attenuation of the backscattered signal allowed in the path between tag_A and tag_B;
CWave_att is the maximum carrier wave attenuation allowed at the intermediate distance between the readable machine and the tag_A for providing the tag_B receiver with the sufficient powering;
P_tagmin.tag_A represents the tag_A receiver sensitivity; and
bkst_loss.tag_B is the tag_B backscattering loss with no modulation of 1 db (admitted rules).

As illustrated in the FIG. 5, the sensitivity of a communication between a tag that is in carrying mode (tag_B) and an adjacent tag that is in catching mode when located within the delimited vicinity is detailed.

A readable machine (502) broadcasts sequentially polled data within a delimited communication range (Rrange) to be received respectively by the tag_B when it is located at spot A (504), then at spot B (506) and finally at spot C (508).

The system operates in a volume equivalent to the intersection of the delimited communication range (Rrange) provided by the readable machine (502) with the catching range existing between a polling tag and a tag that is in catching mode. For example, when the tag_B is located at spot C (508), the resultant volume given by the intersection of the sphere (510) with the sphere (514) represents the operating volume of the system.

By applying the formula 6 (Form.6) on a passive tag (tag_B) for which the minimum energy (P_tagmin) is −10 dBm, it is demonstrated that a semi-passive tag (tag_A) with a receiver sensitivity of −42 dBm can communicate together as shown herein:
P_reader=30 dB;
Rrange=3 meters;
P_tagmin.tag_A=−42 dBm;
P_tagmin.tag_B=−10 dBm; and
bkst_loss.tag_B=−1 dBm.

Tab_B located at spot A (504):

A maximum separating distance of 1 meter with the readable machine gives a gain penalty of 31 dBm that sets Cwave_att at a value equal −1 dBm.

Max_att_all≦−42 dBm−−1 dBm−−1 dBm=−40 dBm.

According to the Formula 4 (Form.4), 40.60 dB of modulation lost represents 3 meters of distance (R1) that is sufficient for communicating with a tag_A in catching mode (not shown here) located in the delimited vicinity (516).

Tab_B located at spot B (506).

A maximum separating distance of 1.5 meters with the readable machine gives a gain penalty of 34.6 dBm that sets Cwave_att at a value equal −4.6 dBm.

Max_att_all≦−42 dBm−−4.6 dBm−−1 dBm=−36.4 dBm.

According to the Formula 4 (Form.4), 37.15 dB of modulation lost represents 2 meters of distance (R2) that is sufficient for communicating with a tag_A, in catching mode (not shown here), located in the delimited vicinity (512).

Tab_B located at spot C (508):

A maximum separating distance of 3 meters with the readable machine, represented by a round frame (510) of 3 meters radius (R0), gives a gain penalty of 40 dBm that sets Cwave_att at a value equal −10 dBm.

Max_att_all≦−42 dBm−−10 dBm−−1 dBm=−31 dBm.

According to the Formula 4 (Form.4), 31.15 dB of modulation lost represents 1 meter of distance (R3) that is sufficient for communicating with a tag_A, in catching mode (not shown) located in the delimited vicinity (514).

It is appreciated that while the invention has been particularly shown and described with reference to a preferred embodiment, various changes in form and detail may be made therein without departing from the spirit, and scope of the invention.

What is claimed is:

1. A method for locating Radio Frequency Identification (RFID) tags, said method comprising:
   a passive RFID tag A receiving a polling command previously transmitted from a RFID reader and addressed to another passive RFID tag B;
   said RFID tag A determining that the polling command is not addressed to the RFID tag A;
   in response to the RFID tag A determining that the polling command is not addressed to the RFID tag A, at a time t1 said RFID tag A setting the RFID tag A to a catching mode configured to catch echos from other tags;
   said RFID tag A receiving at a time t3 an echo of a message sent by the RFID tag B to the RFID reader in response to the polling command received by the RFID tag B at a time t2, wherein the echo comprises an identification of the RFID tag B, and wherein t3>t2>t1;
   said RFID tag A determining a distance (D.t2$t$) between the RFID tag A and the RFID tag B based on a total timing (TT) equal to t3 minus t1;
   said RFID tag A ascertaining that the distance D.t2$t$ does not exceed a specified radius limit; and
   responsive to said ascertaining, said RFID tag A storing the identification of the RFID tag B and the distance D.t2t in a database within the RFID tag A.

2. The method of claim 1, wherein the method further comprises:
   at a time later than the time t3, said RFID tag A sending an identification message to the RFID reader, wherein the identification message includes an identifier of the RFID tag A, a distance between the RFID tag A and the RFID reader, the radius limit, the identification of the RFID tag B, and the distance D.t2$t$.

3. The method of claim 1, wherein said determining the distance D.t2$t$ comprises determining D.t2$t$ according to:

$$D.t2t=(TT-T\text{trig}-TE.r2t.\text{tag}B-TE.r2t.\text{tag}A)*C$$

wherein Ttrig is a specified delay that is not less than a sum of a tag access time for reading the polling command and a granted time for processing the polling command, wherein TE.r2$t$.tagA is a time for the polling command to be transmitted from the RFID reader to the RFID tag A, wherein TE.r2$t$.tagB is a time for the polling command to be transmitted from the RFID reader to the RFID tag B, wherein the polling command comprises TE.r2$t$.tag B, and wherein C is the speed of light.

4. The method of claim 3, wherein Ttrig and TE.r2$t$.tagA were stored in the RFID tag A during an initialization of the RFID tag A which occurred prior to the time t1, wherein the polling command comprises a distance (D.r2$t$.tagB) between the RFID tag B and the RFID reader, and wherein TE.r2$t$.tagB=D.r2$t$.tagB/C.

5. The method of claim 1, wherein the echo of the message sent by the RFID tag B to the RFID reader is a reflection of the polling command received from the RFID reader at the RFID tag B.

6. The method of claim 1, wherein the RFID tag A comprises an antenna and an impedance variation system, and wherein the method further comprises:
   responsive to RFID tag A determining that the polling command is not addressed to the RFID tag A, said impedance variation system adjusting the impedance of the antenna so that the RFID tag A totally absorbs the echo of the message received by the RFID tag A.

7. The method of claim 6, wherein the impedance variation system comprises a three state driver circuit, and wherein said adjusting comprises said three state driver circuit adjusting the impedance of the antenna by adapting a sufficient impedance termination at a base of the antenna to cause the RFID tag A to totally absorb the echo of the message received by the RFID tag A.

8. A computer program product comprising a computer usable storage medium having a computer readable program code embodied in the medium, said program code configured to be executed on a processor of a computer system to perform a method for locating Radio Frequency Identification (RFID) tags, said method comprising:
   a passive RFID tag A receiving a polling command previously transmitted from a RFID reader and addressed to another passive RFID tag B;
   said RFID tag A determining that the polling command is not addressed to the RFID tag A;
   in response to the RFID tag A determining that the polling command is not addressed to the RFID tag A, at a time t1 said RFID tag A setting the RFID tag A to a catching mode configured to catch echos from other tags;
   said RFID tag A receiving at a time t3 an echo of a message sent by the RFID tag B to the RFID reader in response to the polling command received by the RFID tag B at a time t2, wherein the echo comprises an identification of the RFID tag B, and wherein t3>t2>t1;
   said RFID tag A determining a distance (D.t2$t$) between the RFID tag A and the RFID tag B based on a total timing (TT) equal to t3 minus t1;
   said RFID tag A ascertaining that the distance D.t2$t$ does not exceed a specified radius limit; and
   responsive to said ascertaining, said RFID tag A storing the identification of the RFID tag B and the distance D.t2$t$ in a database within the RFID tag A.

9. The computer program product of claim 8, wherein the method further comprises:
at a time later than the time t3, said RFID tag A sending an identification message to the RFID reader, wherein the identification message includes an identifier of the RFID tag A, a distance between the RFID tag A and the RFID reader, the radius limit, the identification of the RFID tag B, and the distance D.t2t.

10. The computer program product of claim 8, wherein said determining the distance D.t2t comprises determining D.t2t according to:

$$D.t2t=(TT-Ttrig-TE.r2t.tagB-TE.r2t.tagA)*C$$

wherein Ttrig is a specified delay that is not less than a sum of a tag access time for reading the polling command and a granted time for processing the polling command, wherein TE.r2t.tagA is a time for the polling command to be transmitted from the RFID reader to the RFID tag A, wherein TE.r2t.tagB is a time for the polling command to be transmitted from the RFID reader to the RFID tag B, wherein the polling command comprises TE.r2t.tagB, and wherein C is the speed of light.

11. The computer program product of claim 10, wherein Ttrig and TE.r2t.tagA were stored in the RFID tag A during an initialization of the RFID tag A which occurred prior to the time t1, wherein the polling command comprises a distance (D.r2t.tagB) between the RFID tag B and the RFID reader, and wherein TE.r2t.tagB=D.r2t.tagB/C.

12. The computer program product of claim 8, wherein the echo of the message sent by the RFID tag B to the RFID reader is a reflection of the polling command received from the RFID reader at the RFID tag B.

13. The computer program product of claim 8, wherein the RFID tag A comprises an antenna and an impedance variation system, and wherein the method further comprises:
responsive to RFID tag A determining that the polling command is not addressed to the RFID tag A, said impedance variation system adjusting the impedance of the antenna so that the RFID tag A totally absorbs the echo of the message received by the RFID tag A, wherein the impedance variation system comprises a three state driver circuit, and wherein said adjusting comprises said three state driver circuit adjusting the impedance of the antenna by adapting a sufficient impedance termination at a base of the antenna to cause the RFID tag A to totally absorb the echo of the message received by the RFID tag A.

14. A passive Radio Frequency Identification (RFID) tag, said RFID tag denoted as a RFID tag A, said RFID tag A comprising:
means for receiving a polling command previously transmitted from a RFID reader and addressed to another passive RFID tag denoted as a RFID tag B;
means for determining that the polling command is not addressed to the RFID tag A;
means for setting the RFID tag A at a time t1 to a catching mode configured to catch echos from other tags in response to the RFID tag A determining that the polling command is not addressed to the RFID tag A;
means for receiving at a time t3 an echo of a message sent by the RFID tag B to the RFID reader in response to the polling command received by the RFID tag B at a time t2, wherein the echo comprises an identification of the RFID tag B, and wherein t3>t2>t1;
means for determining a distance (D.t2t) between the RFID tag A and the RFID tag B based on a total timing (TT) equal to t3 minus t1;
means for ascertaining that the distance D.t2t does not exceed a specified radius limit; and
means for storing the identification of the RFID tag B and the distance D.t2t in a database within the RFID tag A in response to said ascertaining.

15. The RFID tag of claim 14, further comprising:
means for sending an identification message to the RFID reader at a time later than the time t3, wherein the identification message includes an identifier of the RFID tag A, a distance between the RFID tag A and the RFID reader, the radius limit, the identification of the RFID tag B, and the distance D.t2t.

16. The RFID tag of claim 14, wherein said means for determining comprises means for determining the distance D.t2t according to:

$$D.t2t=(TT-Ttrig-TE.r2t.tagB-TE.r2t.tagA)*C$$

wherein Ttrig is a specified delay that is not less than a sum of a tag access time for reading the polling command and a granted time for processing the polling command, wherein TE.r2t.tagA is a time for the polling command to be transmitted from the RFID reader to the RFID tag A, wherein TE.r2t.tagB is a time for the polling command to be transmitted from the RFID reader to the RFID tag B, wherein the polling command comprises TE.r2t.tagB, and wherein C is the speed of light.

17. The RFID tag of claim 16, means for storing Ttrig and TE.r2t.tagA in the RFID tag A during an initialization of the RFID tag A which occurred prior to the time t1, wherein the polling command comprises a distance (D.r2t.tagB) between the RFID tag B and the RFID reader, and wherein TE.r2t.tagB=D.r2t.tagB/C.

18. The RFID tag of claim 14, wherein the echo of the message sent by the RFID tag B to the RFID reader is a reflection of the polling command received from the RFID reader at the RFID tag B.

19. The RFID tag of claim 14, wherein the RFID tag A comprises:
an antenna; and
an impedance variation system configured to adjust an impedance of the antenna so that the RFID tag A totally absorbs the echo of the message received by the RFID tag A in response to the RFID tag A determining that the polling command is not addressed to the RFID tag A.

20. The RFID tag of claim 19, wherein the impedance variation system comprises a three state driver circuit configured to adjust the impedance of the antenna by adapting a sufficient impedance termination at a base of the antenna to cause the RFID tag A to totally absorb the echo of the message received by the RFID tag A.

* * * * *